Sept. 30, 1941.        C. G. ALEXANDER             2,257,408
                         PIECRUST GUARD
                       Filed Nov. 6, 1940

Inventor
Charles G. Alexander

By Clarence A. O'Brien

Attorney

Patented Sept. 30, 1941

2,257,408

UNITED STATES PATENT OFFICE 2,257,408

PIECRUST GUARD

Charles G. Alexander, Lorain, Ohio

Application November 6, 1940, Serial No. 364,580

2 Claims. (Cl. 53—6)

The present invention relates to new and useful improvements in attachment for pie pans and has for its primary object to provide a guard for covering the pie crust at the edge of the pie pan to prevent the same from becoming burnt or scorched while the pie is being baked.

A further object is to provide a device of this character of simple and practical construction, which is efficient and reliable in performance, relatively inexpensive to manufacture, easy to install in position on the pie pan and otherwise well adapted for the purposes for which the same is intended.

Other objects and advantages reside in the details of construction as more fully hereinafter described and claimed, reference being had to the accompanying drawing forming part hereof, wherein like numerals refer to like parts throughout, and in which—

Figure 1:
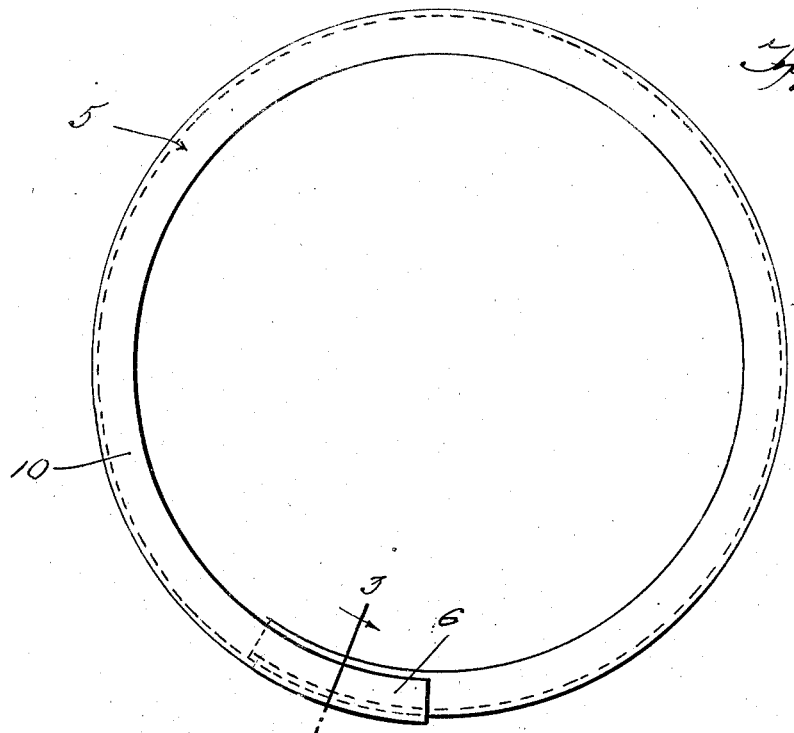
Figure 1 is a plan view of the guard.

Referring now to the drawing in detail, the numeral 5 designates a transversely slit ring member preferably constructed of lightweight spring metal and with the split ends overlapped as shown at 6.

The ring member, at its outer periphery, is formed with a downturned flange 7.

Figure 2:
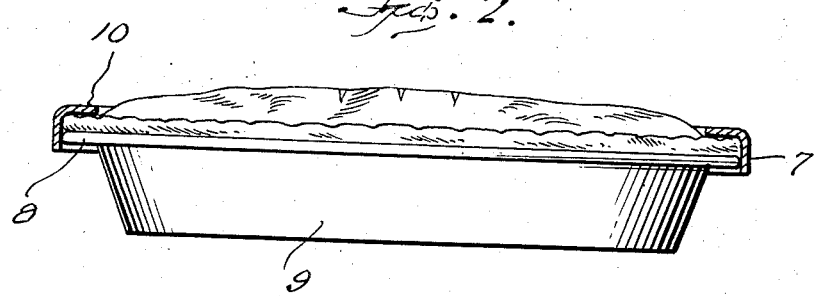
Figure 2 is a side elevational view of a pie pan showing the guard in section when mounted in position thereon.
Figure 3:
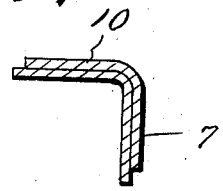
Figure 3 is a sectional view taken substantially on a line 3—3 of Figure 1.

The spring material of the ring member enables the same to be expanded and contracted to conformably fit on the flanged edge 8 of a pie pan 9 so that the inwardly projecting edge 10 of the guard will overlie the pie crust which usually covers the flanged edge 8, in a manner as more clearly shown in Figure 2 of the drawing, whereby to protect said crust while the pie is being baked, and to prevent the crust from being burned.

As shown to advantage in Figure 2, the downturned flange 7 projects below the flanged edge 8 of the pie pan in order that the device may be gripped by the fingers for expanding the ring to facilitate removal thereof from the pan.

It is believed the details of construction, advantages and manner of use of the device will be readily understood from the foregoing without further detailed explanation.

Having described the invention, what I claim is:

1. A pie crust guard comprising a transversely split ring member, said ring member being of angular formation in cross section and having its split ends disposed in overlapping relation and adapted for positioning on the rim of a pie pan with one edge of the ring member overlying the crust of the pie.

2. A pie crust guard comprising a transversely split ring member, said ring member being of angular formation in cross section and having its split ends disposed in overlapping relation, said ring member including an inwardly projecting flange adapted to cover the crust of the edge of the pie and a downwardly projecting flange terminating below the rim of the pie pan to provide a finger grip for expanding the ring member when removing the same from the pie.

CHARLES G. ALEXANDER.